(12) United States Patent
Chen et al.

(10) Patent No.: US 11,643,004 B2
(45) Date of Patent: May 9, 2023

(54) SAFETY TENSIONING DEVICE FOR AUTOMOBILES

(71) Applicant: NINGBO XULI METAL PRODUCTS CO., LTD., Zhejiang (CN)

(72) Inventors: Weiguo Chen, Zhejiang (CN); Yanqiong Chen, Zhejiang (CN); Wei Deng, Zhejiang (CN)

(73) Assignee: NINGBO XULI METAL PRODUCTS CO., LTD., Zhejiang (CN)

( * ) Notice: Subject to any disclaimer, the term of this patent is extended or adjusted under 35 U.S.C. 154(b) by 386 days.

(21) Appl. No.: 17/110,307

(22) Filed: Dec. 3, 2020

(65) Prior Publication Data
US 2021/0170937 A1 Jun. 10, 2021

(30) Foreign Application Priority Data
Dec. 6, 2019 (CN) .......................... 201911237673.8

(51) Int. Cl.
*B60P 7/08* (2006.01)

(52) U.S. Cl.
CPC ............. *B60P 7/0846* (2013.01); *B60P 7/083* (2013.01)

(58) Field of Classification Search
CPC ........... B60P 7/0846; B60P 7/083; B60P 7/06; B60P 7/08
USPC ..... 410/100, 101, 106, 102, 116, 97, 90, 84, 410/81, 77
See application file for complete search history.

(56) References Cited

U.S. PATENT DOCUMENTS

| 8,905,379 | B2 * | 12/2014 | Huang | .................. B60P 7/0846 254/218 |
| 10,717,381 | B2 * | 7/2020 | Chu | ...................... B60P 7/0861 |
| 2009/0119892 | A1 * | 5/2009 | Breeden | .................. B60P 7/083 24/68 CD |
| 2014/0008480 | A1 * | 1/2014 | Kingery | .................. B60P 7/083 242/389 |
| 2016/0250961 | A1 * | 9/2016 | Tolly | ..................... B60P 7/0846 410/100 |
| 2016/0347233 | A1 * | 12/2016 | Kingery | ................ B60P 7/0846 |
| 2020/0339029 | A1 * | 10/2020 | Chen | ..................... B60P 7/0823 |

* cited by examiner

Primary Examiner — Paul N Dickson
Assistant Examiner — Sunsurraye Westbrook
(74) Attorney, Agent, or Firm — JCIP Global Inc.

(57) ABSTRACT

A safety tensioning device includes a base, a handle, a winding mechanism and a first bundling strap. The first bundling strap is disposed on the main rotating shaft and the winding mechanism. The winding mechanism includes a box, a coil spring component and a winding shaft passing through the box with two ends exposed out of the box. One end of the winding shaft is attached to the coil spring component, a centrifugal self-locking mechanism to stop the winding shaft winding when a rotation speed is too fast, is attached to another end of the winding shaft.

10 Claims, 19 Drawing Sheets

SAFETY TENSIONING DEVICE FOR AUTOMOBILES

CROSS-REFERENCE TO RELATED APPLICATION

This application claims the priority benefit of China application serial no. 201911237673.8, filed on Dec. 6, 2019. The entirety of the above-mentioned patent application is hereby incorporated by reference herein and made a part of this specification.

BACKGROUND

Technical Field

The present invention relates to a safety tensioning device for automobiles which is used for fixing and fastening cargo on vehicles such as automobiles, trailers, airplanes and ships.

Description of Related Art

The safety tensioning device for automobiles usually consists of a tensioning device body, a long bundling strap, a short bundling strap or the like. The device body employs an anti-reverse rotation ratchet mechanism. A driving pawl is driven directly by a handle, the driving pawl pushes a ratchet wheel, and the ratchet wheel directly drives a main rotating shaft, so that a strap wound onto the main rotating shaft is tensioned. A locking pawl prevents the ratchet wheel from reverse rotation, so that certain tension can be maintained on the bundling strap and the cargo can be tied up and fixed. The working length of the device will be different according to different application scenarios, so the excessive bundling strap will always fly outside the device, resulting in potential safety hazards; and, the bundling strap is very messy after use, thus affecting the latter use. There have been some commercially available products for automatically winding the bundling strap, wherein the bundling strap and the hook can be automatically wound by the stored energy of the scroll spring. Although the above problems can be solved, if the retraction is fast in the winding process, the metal hook may bounce back quickly and hit the operator, thereby causing harm to the human body. In summary, it is necessary to further improve the existing safety tensioning devices for automobiles.

SUMMARY

In view of the current situation of the prior art, it is an object of the present invention to provide a safety tensioning device for automobiles which can prevent a hook from bouncing back suddenly to hurt a person.

For achieving the above object, the safety tensioning device comprises a base, a handle, a winding mechanism and a first bundling strap having an inner end and a free end. The handle and the winding mechanism are disposed on the base. A main rotating shaft driven by the handle is rotatably disposed on the base. The first bundling strap is disposed on the main rotating shaft and the winding mechanism. The winding mechanism comprises a box for winded bundling strap, a coil spring component and a winding shaft with two ends. The winding shaft passes through the box, and the two ends of the winding shaft are exposed out of the box, the inner end of the first bundling strap is attached to the winding shaft. One end of the winding shaft is attached to the coil spring component, a centrifugal self-locking mechanism to stop the winding shaft winding when a rotation speed of the winding shaft is in an overspeed state, is attached to another end of the winding shaft.

The centrifugal self-locking mechanism may be of various structures. Preferably, the centrifugal self-locking mechanism comprises a rotary tray, a centrifugal pawl having a tooth portion, an elastic element and a self-locking ratchet wheel having a plurality of teeth. The rotary tray is attached to the winding shaft and is synchronously co-rotatable with the winding shaft, the centrifugal pawl is rotatably connected to the rotary tray, the elastic element is disposed between the rotary tray and the centrifugal pawl and keeps the tooth portion of the centrifugal pawl in a trend of doing a centripetal motion without being meshed with the teeth of the self-locking ratchet wheel.

Preferably, the elastic element is a spring. A pivot shaft protrudes from an upper portion of an outer side surface of the rotary tray; the centrifugal pawl is pivoted onto the pivot shaft. One end of the centrifugal pawl forms the tooth portion and the other end thereof forms a spring resisting portion. A boss is further disposed on the outer side surface of the rotary tray. An upper end of the spring abuts against the spring resisting portion, while a lower end thereof abuts against the boss. In addition, the elastic element may also be a torsion spring, a leaf spring or the like.

Preferably, the rotary tray, the centrifugal pawl and the spring are all disposed inside the self-locking ratchet wheel, and the teeth are disposed on an inner peripheral wall of the self-locking ratchet wheel.

Preferably, the rotary tray and the winding shaft are configured as separated components or integrated as one piece, and the box and the base are configured separated components or integrated as one piece.

The coil spring component may be of various structures. Preferably, the coil spring component comprises a coil spring and a coil spring box sleeved on the coil spring. An inner hook of the coil spring is connected to the winding shaft, and an outer hook of the coil spring is connected to the coil spring box.

To enable the handle to smoothly drive the main rotating shaft, the tensioning device further comprises a transmission mechanism driven by the handle. The transmission mechanism comprises a main rotating shaft, a plurality of ratchet wheels, a driving pawl component and a locking pawl component. The ratchet wheels are disposed on the main rotating shaft. Both the driving pawl component and the locking pawl component are coordinated with the ratchet wheels. The driving pawl component is disposed on the handle, and the locking pawl component is disposed on the base.

Preferably, the main rotating shaft comprises a first semicircular shaft and a second semicircular shaft. The main rotating shaft is disposed in a front portion of the base. The ratchet wheels are respectively disposed at two ends of the main rotating shaft. The winding shaft is disposed in parallel in a rear portion of the main rotating shaft. A front portion of the handle is disposed on the main rotating shaft.

Preferably, the main rotating shaft and the winding shaft are disposed coaxially. The main rotating shaft axially passes through the winding shaft and is rotatable with the winding shaft synchronously. The ratchet wheels are disposed on the winding shaft. The handle is disposed on the main rotating shaft.

Compared with the prior art, in the safety tensioning device for automobiles provided by the present invention, the coil spring component is disposed at one end of the winding shaft, and the centrifugal self-locking mechanism is disposed at the other end of the winding shaft. When in use, when a strap is retracted at a high speed, the generated centrifugal force can enable the centrifugal self-locking mechanism to act, and the action of the centrifugal self-locking mechanism can stop the rotation of the winding shaft. Accordingly, the hook of the bundling strap can be prevented from bouncing back to hurt the operator or other persons in the strap winding process, and the safety in use is improved.

DESCRIPTION OF THE EMBODIMENTS

Figure 1:
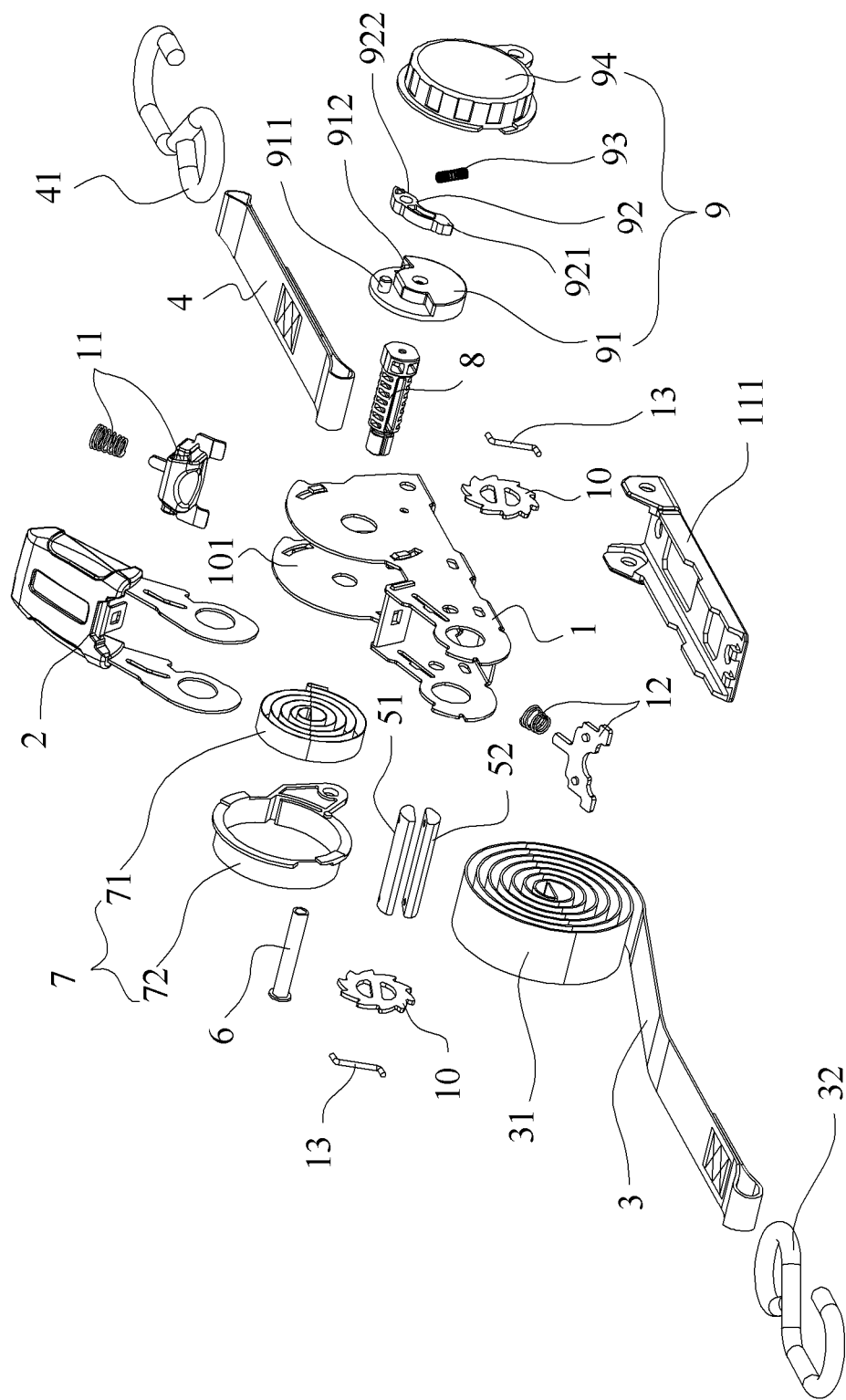
FIG. 1 is an exploded perspective view of an safety tensioning device according to Embodiment 1 of the present invention.
Figure 2:
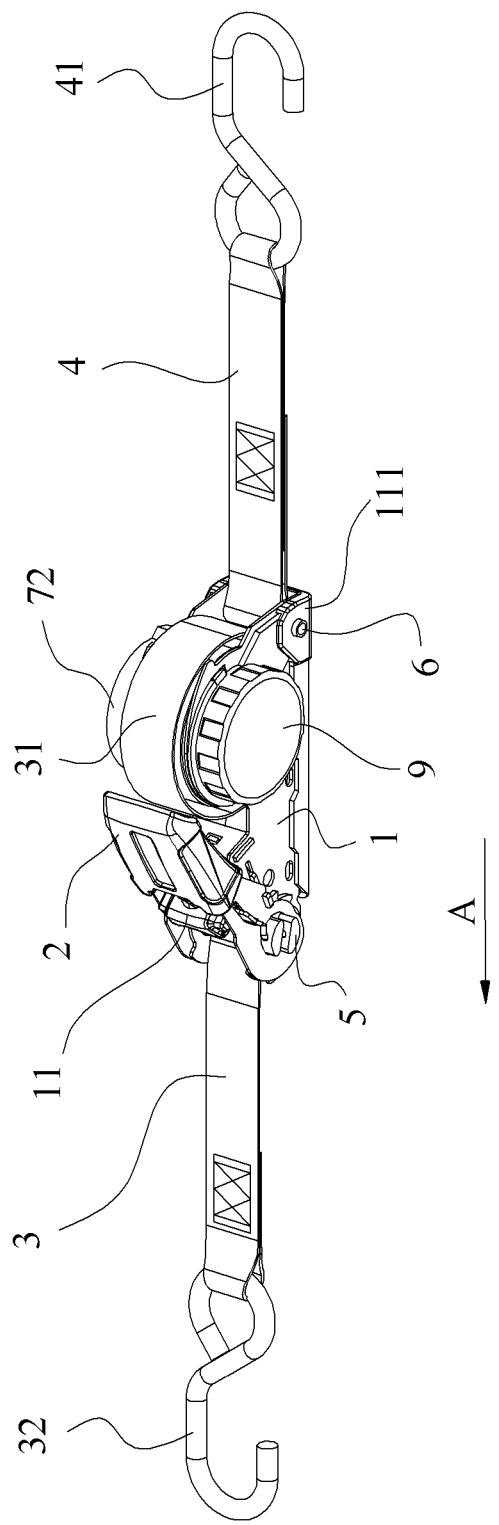
FIG. 2 is a perspective view of the safety tensioning device according to Embodiment 1 of the present invention.
Figure 3:
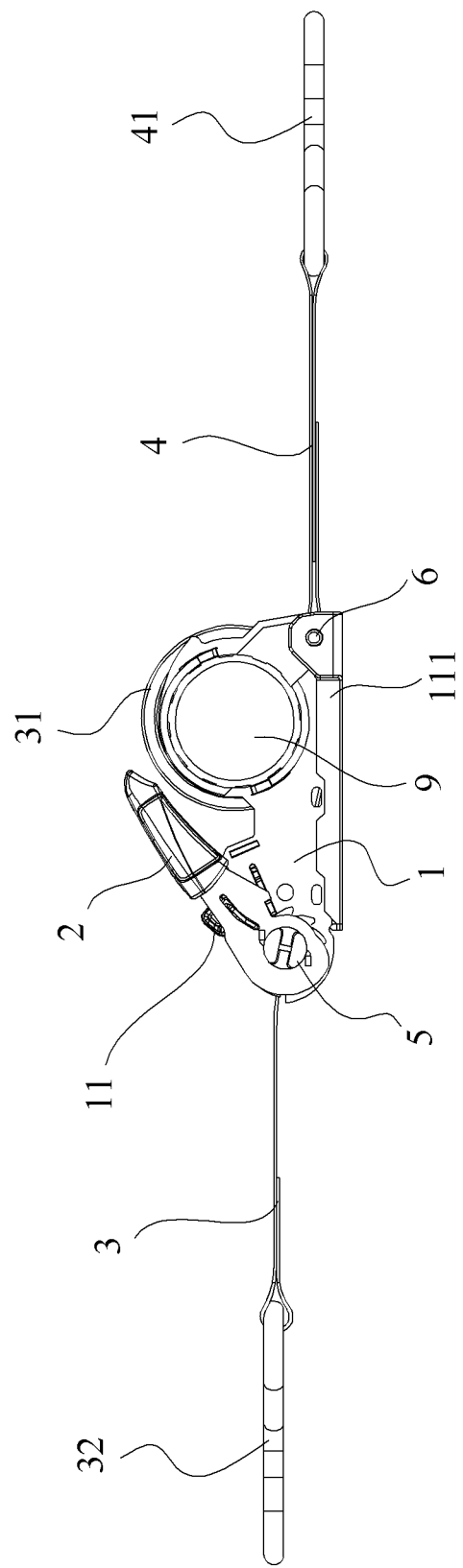
FIG. 3 is a front view of the safety tensioning device according to Embodiment 1 of the present invention.
Figure 4:
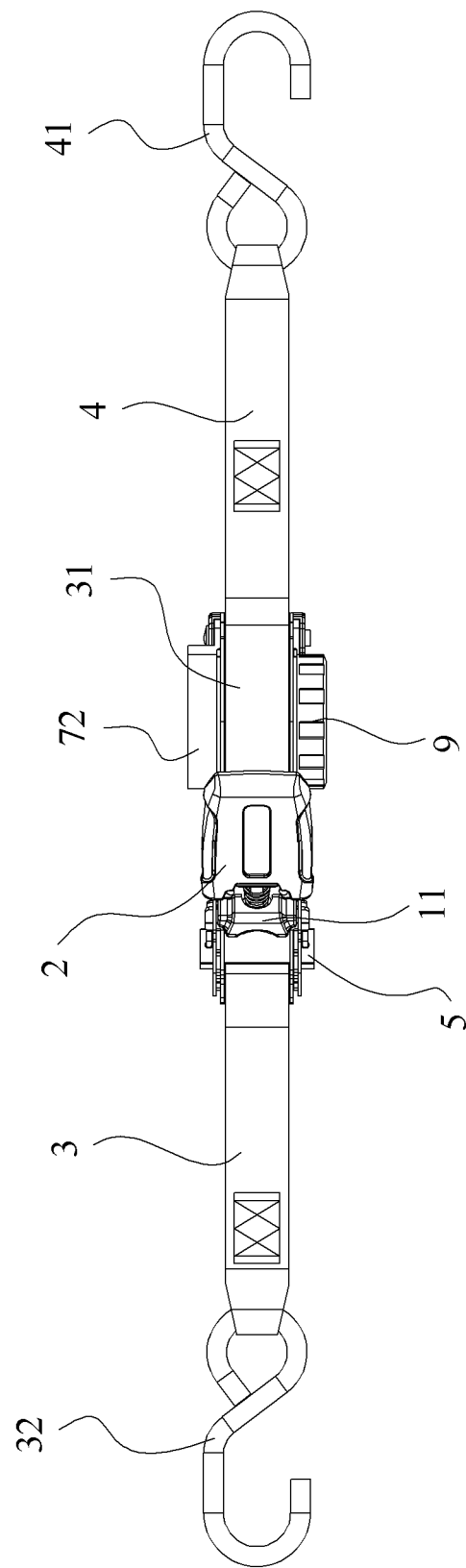
FIG. 4 is a top view of the safety tensioning device according to Embodiment 1 of the present invention.
Figure 5:
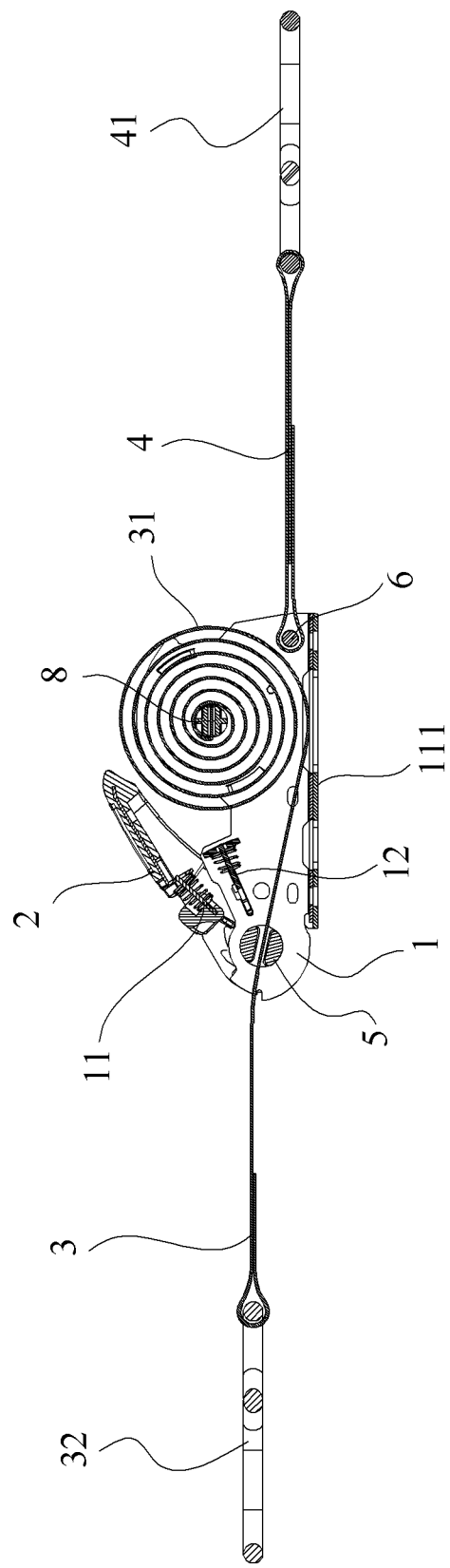
FIG. 5 is a sectional view of the safety tensioning device according to Embodiment 1 of the present invention.
Figure 6:
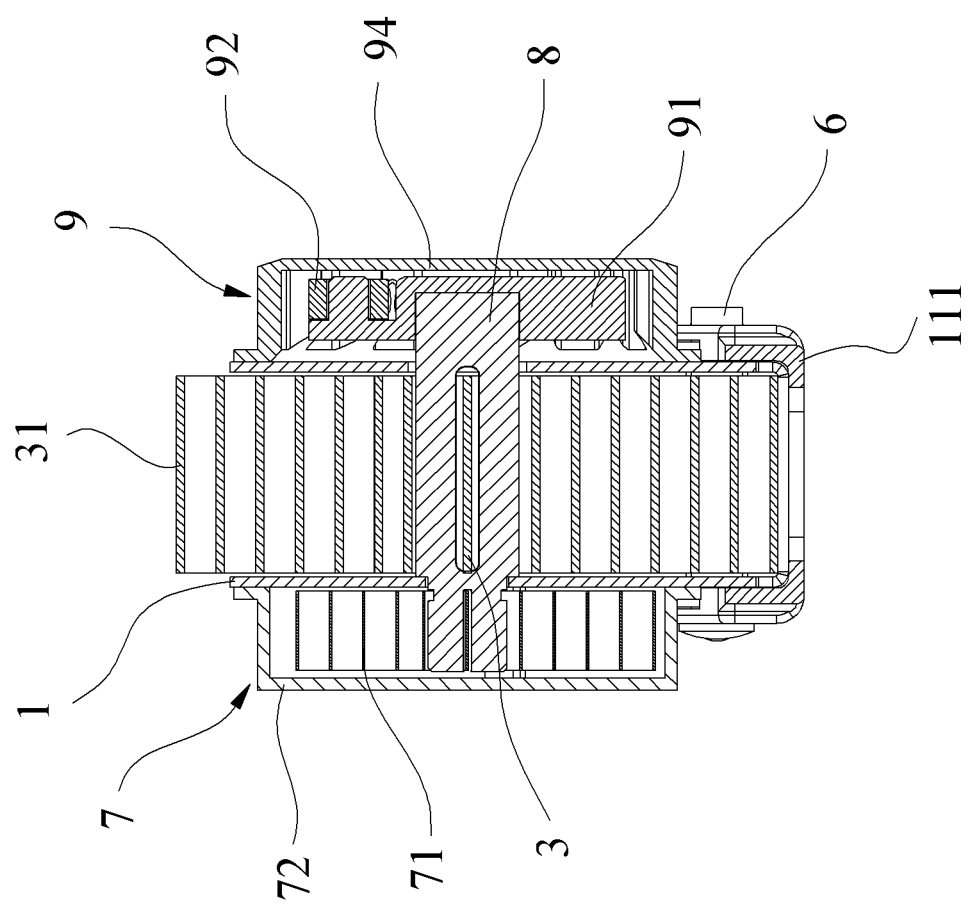
FIG. 6 is a sectional view of a winding portion according to Embodiment 1 of the present invention.
Figure 7:
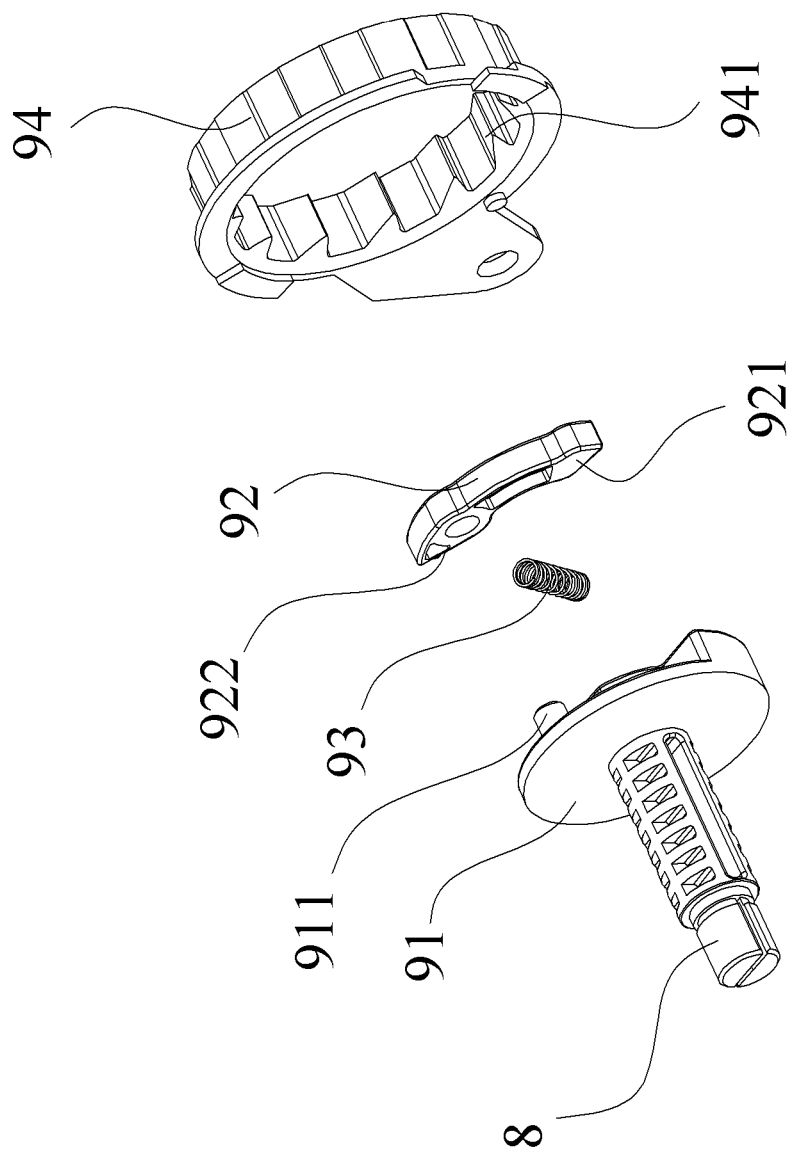
FIG. 7 is an exploded perspective view of a centrifugal self-locking mechanism according to Embodiment 1 of the present invention.

The present invention will be further described in detail by embodiments with reference to the accompanying drawings.

Embodiment 1

As shown in FIG. 1-FIG. 6, the safety tensioning device for automobiles in this embodiment comprises a base 1, a handle 2, a transmission mechanism, a winding mechanism, a first bundling strap 3 and a second bundling strap 4. By taking the direction indicated by arrow (A) in FIG. 2 as a forward direction, a base housing 111 is disposed on a bottom portion of the base 1, a fixation shaft 6 is disposed at a rear end of the base 1, the second bundling strap 4 is a short strap disposed on the fixation shaft 6, and a second hook 41 is disposed at an outer end of the second bundling strap 4. The tensioning device further comprises a transmission mechanism driven by the handle 2. The transmission mechanism comprises a main rotating shaft 5, a plurality of ratchet wheels 10, a driving pawl component 11 and a locking pawl component 12. The main rotating shaft 5 is disposed in a front portion of the base 1, and the main rotating shaft 5 is parallel to the fixation shaft 6. The handle 2 and the ratchet wheels 10 are disposed on the main rotating shaft 5. An outer end of the main rotating shaft 5 is fixed by a fixation pin 13. Both the main rotating shaft 5 and the ratchet wheels 10 can rotate synchronously under the driving of the handle 2. In this embodiment, the main rotating shaft 5 comprises a first semicircular shaft 51 and a second semicircular shaft 52.

The driving pawl component 11 is disposed on the handle 2, and the locking pawl component 12 is disposed on the base 1. Both the driving pawl component 11 and the locking pawl component 12 are coordinated with the ratchet wheels 10. The driving pawl component 11 comprises a driving pawl and a spring, and the locking pawl component 12 comprises a locking pawl and a spring. The action principle of the transmission mechanism is the same as that of the existing safety tensioning devices for automobiles, and will not be specifically described here.

The winding mechanism comprises a box 101, a coil spring component 7 and a winding shaft 8. The box 101 is formed in a rear portion of the base 1, that is, the box 101 and the base 1 are integrated as one piece. Of course, the box 101 and the base 1 may also be two separated components. The winding shaft 8 passes through the box 101, and two ends of the winding shaft 8 are exposed out of the box 101. The winding shaft 8 is parallel to the main rotating shaft 5. The first bundling strap 3 is a long strap. A first hook 32 is disposed at an outer end of the first bundling strap 3, and an inner end of the first bundling strap 3 passes backward through the main rotating shaft 5 to form a wound strap 31. An inner end of the round strap 31 is disposed on the winding shaft 8. At this time, the main rotating shaft 5, with the first bundling strap 3 wound thereon, bears a tensile force from the device, and the winding shaft 8 does not bear the tensile fore and is merely used for winding the strap. One end of the winding shaft 8 is attached to the coil spring component 7. The coil spring component 7 comprises a coil spring 71 and a coil spring box 72 sleeved on the coil spring 71. An inner hook of the coil spring 71 is connected to the winding shaft 8, and an outer hook of the coil spring 71 is connected to the coil spring box 72. A centrifugal self-locking mechanism 9 to stop the winding shaft 8 winding when the rotation speed of the winding shaft 8 is too fast (in an overspeed state), is attached to the other end of the winding shaft 8.

As shown in FIG. 7-FIG. 10, the centrifugal self-locking mechanism 9 in this embodiment comprises a rotary tray 91, a centrifugal pawl 92, a spring 93 and a self-locking ratchet wheel 94. The rotary tray 91 and the winding shaft 8 may be configured as two separated components or may be integrated as one piece. However, it is necessary to ensure the rotary tray 91 attaching to the winding shaft 8 rotatably with the winding shaft 8. A pivot shaft 911 protrudes from an upper portion of an outer side surface of the rotary tray 91, and the centrifugal pawl 92 is pivotally connected onto the pivot shaft 911, so that the centrifugal pawl 92 can rotate relative to the rotary tray 91. One end of the centrifugal pawl 92 forms the tooth portion 921 and the other end thereof forms a spring resisting portion 922. A boss 912 is further disposed on the outer side surface of the rotary tray 91. An upper end of the spring 93 abuts against the spring resisting portion 922, while a lower end thereof abuts against the boss 912. The rotary tray 91, the centrifugal pawl 92 and the spring 93 are all disposed inside the self-locking ratchet wheel 94, and a plurality of teeth 941 are disposed on an inner peripheral wall of the self-locking ratchet wheel 94. Under the action of the spring 93, the tooth portion 921 of the centrifugal pawl 92 is kept in a trend of doing a centripetal motion without being meshed with the teeth 941 of the self-locking ratchet wheel 94.

The operating principle of the safety tensioning device for automobiles will be described below.

Figure 8:
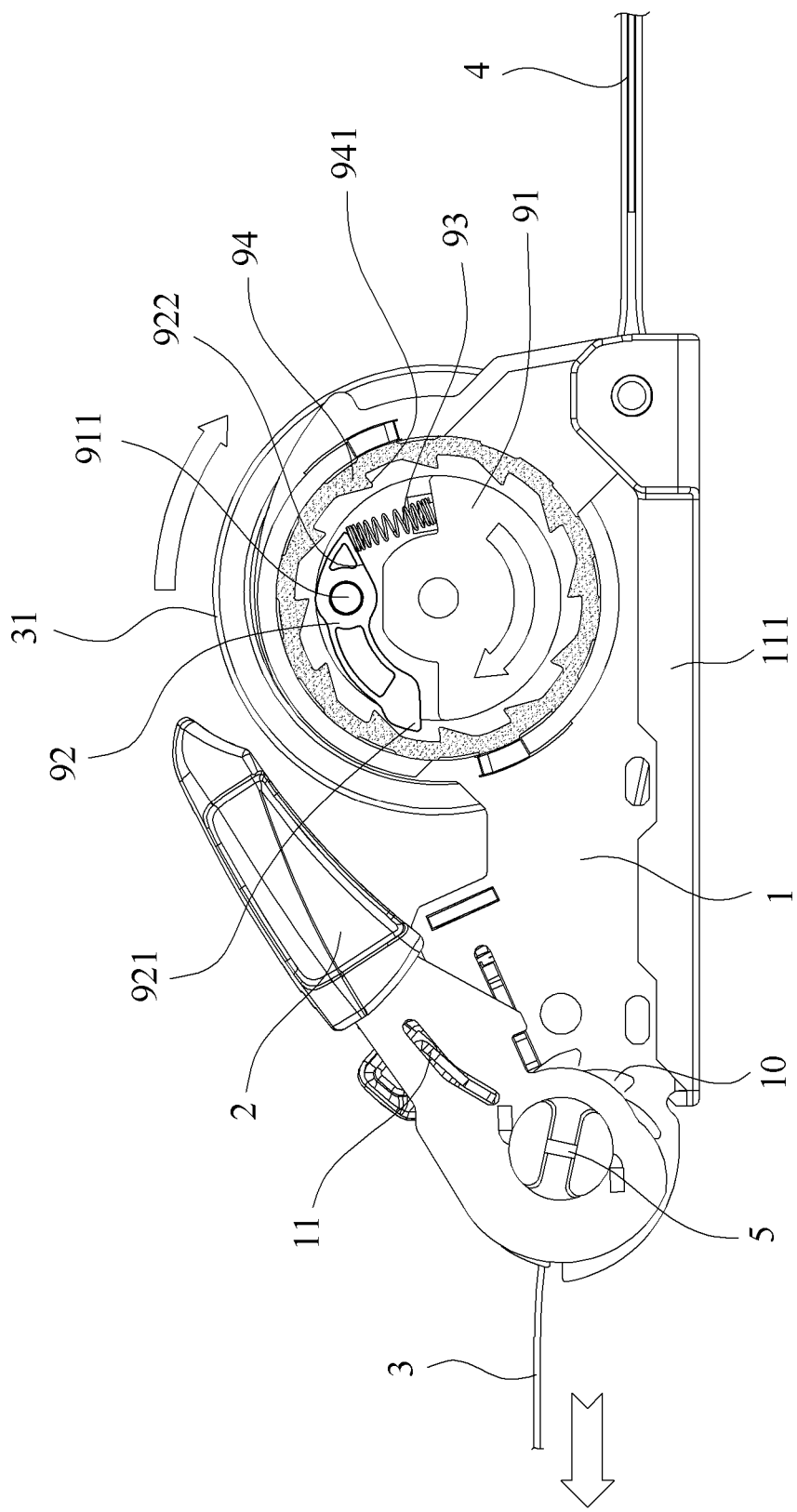
FIG. 8 is a diagrammatic view of a self-locking device when a long strap is pulled out according to Embodiment 1 of the present invention.

When not in use, under the action of the coil spring 71, the first bundling strap 3 is received in the box 101. When a bundling operation is required, according to the requirements of actual application scenarios, the first bundling strap 3 will be pulled out by a corresponding length. As shown in FIG. 8, when the first bundling strap 3 is pulled out, the wound strap 31 rotates in the shown clockwise direction, to drive the winding shaft 8 and the rotary tray 91 to rotate in the clockwise direction. When the rotation speed is low, due to the elastic force of the spring 93, the generated centrifugal force is not enough to open the tooth portion 921. When the rotation speed is high, the generated centrifugal force exceeds the elastic force of the spring 93, and the centrifugal pawl 92 rotates clockwise around the pivot shaft 911 to open the tooth portion 921. However, it can be known from the ratchet principle that the tooth portion 921 will not stop the rotation of the rotary tray 91 even if the tooth portion 921 comes into contact with the teeth 941 of the self-locking ratchet wheel 94, that is, the tooth portion 921 will not be locked no matter how fast it is pulled out.

Figure 9:
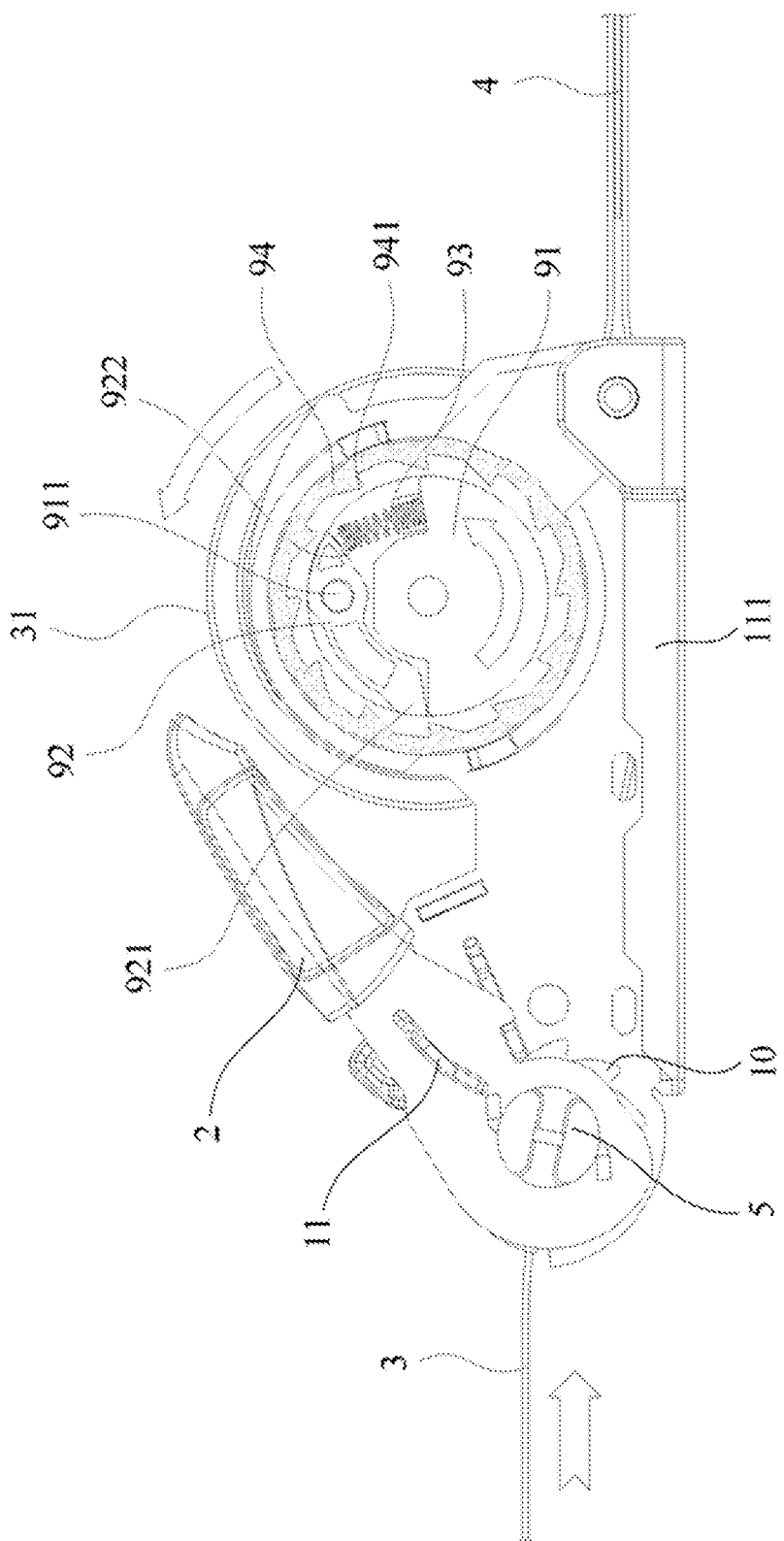
FIG. 9 is a diagrammatic view of the self-locking device when the long strap is retracted slowly according to Embodiment 1 of the present invention.

As shown in FIG. 9, when the first bundling strap 3 is to be retracted after use, the first bundling strap 3 may be retracted slowly (for example, the first bundling strap or the hook is held by a hand). At this time, the wound strap 31 and the rotary tray 91 rotate counterclockwise, the retraction speed allows a low rotation speed of the rotary tray 91, and the generated centrifugal force is not enough to exceed the elastic force of the spring 93, so that the tooth portion 921 of the centrifugal pawl 92 will not be opened and will not come into contact with the teeth 941. In this way, the first bundling strap can be wound smoothly.

Figure 10:
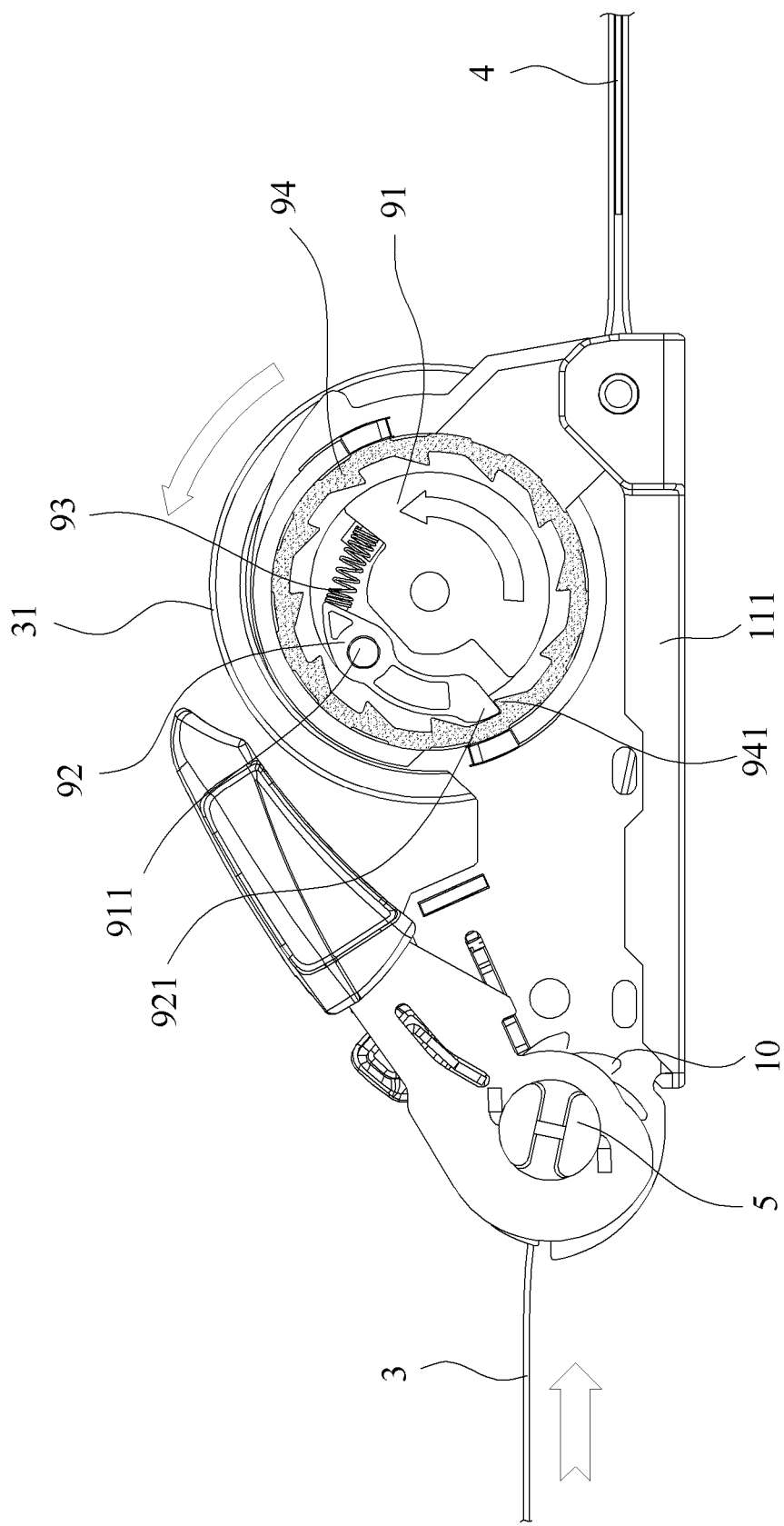
FIG. 10 is a diagrammatic view of the activation of self-locking when the long strap is retracted quickly according to Embodiment 1 of the present invention.

As shown in FIG. 10, when the winding is too fast (intentionally or unintentionally, for example, due to sudden releasing or unhooking, the coil spring 71 generates a force to allow the winding shaft 8 to rotate quickly), a sufficient centrifugal force is generated to open the tooth portion 921 of the centrifugal pawl 92. At this time, the tooth portion 921 comes into contact with and locks the teeth 941, so that the rotary tray 91 cannot be rotated. Accordingly, the hook is prevented from bouncing back to hurt the operator or other persons, and the safety in use is improved.

In the locked state, by pulling the first bundling strap 3 out a little again, the rotary tray 91 rotates clockwise, so that the tooth portion 921 is separated from the teeth 941. Under the action of the spring 93, the centrifugal pawl 92 is reset, and the first bundling strap 3 is retracted slowly.

Embodiment 2

Figure 11:
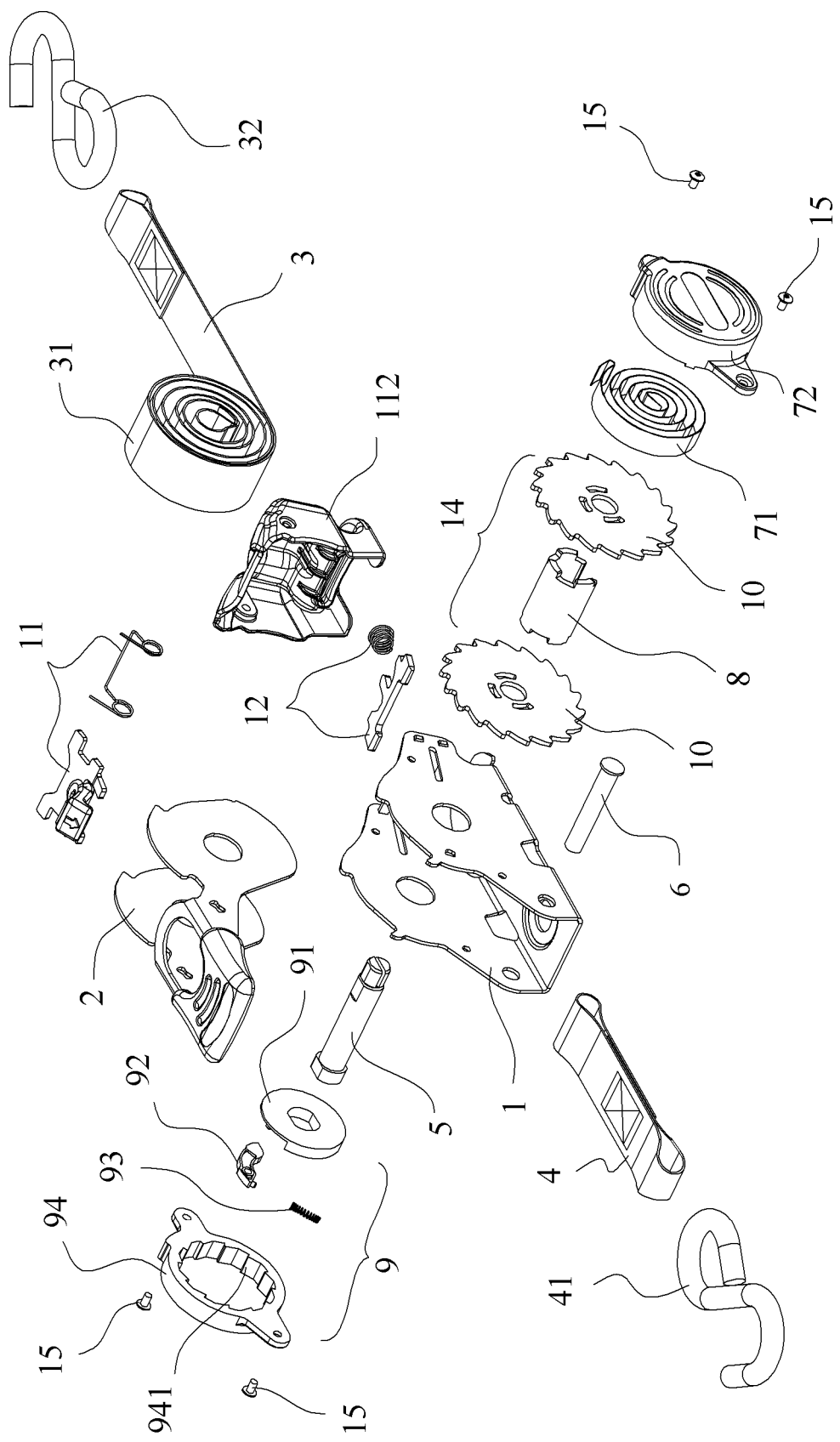
FIG. 11 is an exploded perspective view of the safety tensioning device according to Embodiment 2 of the present invention.
Figure 12:
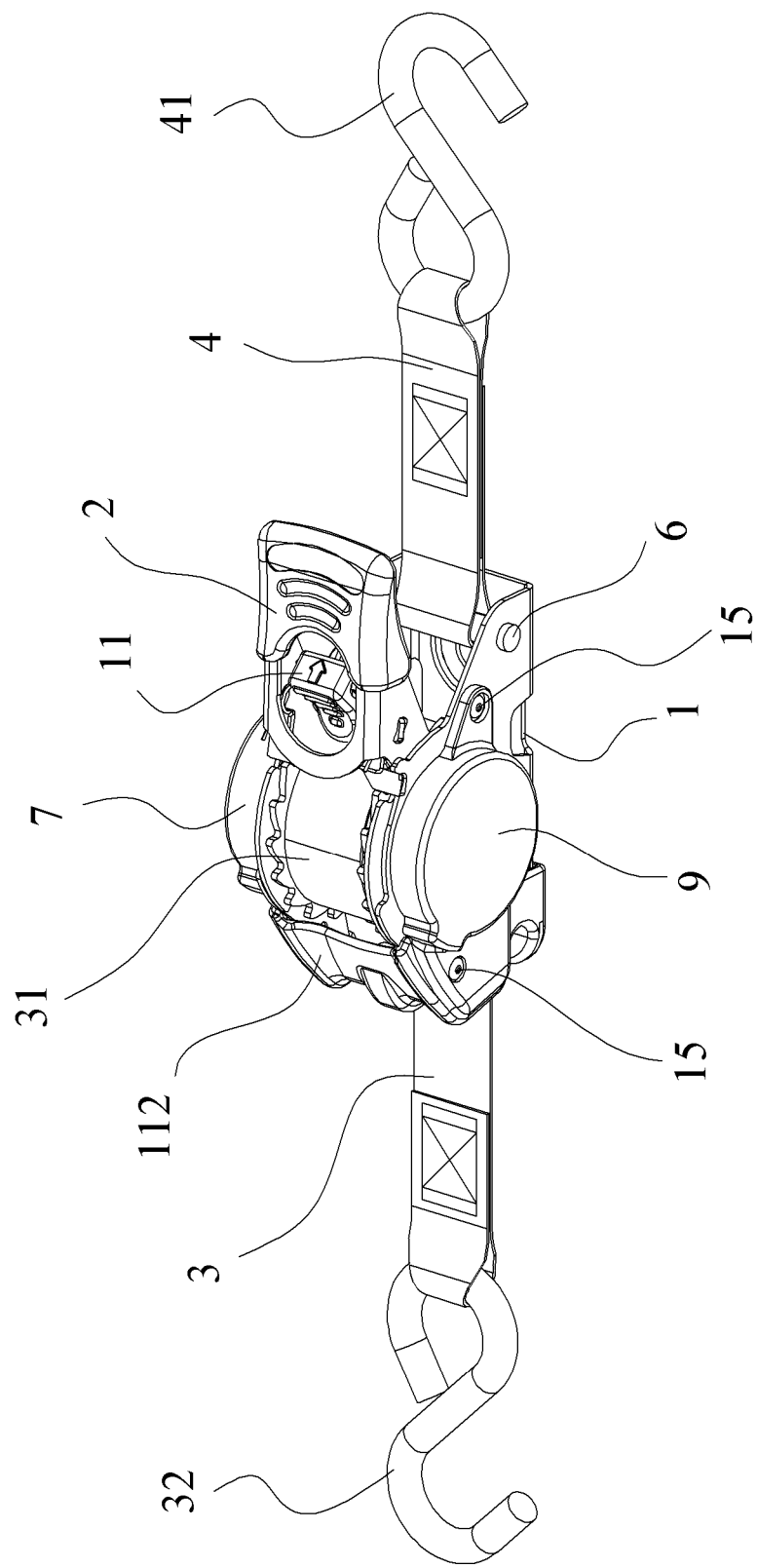
FIG. 12 is a perspective view of the safety tensioning device according to Embodiment 2 of the present invention.
Figure 13:
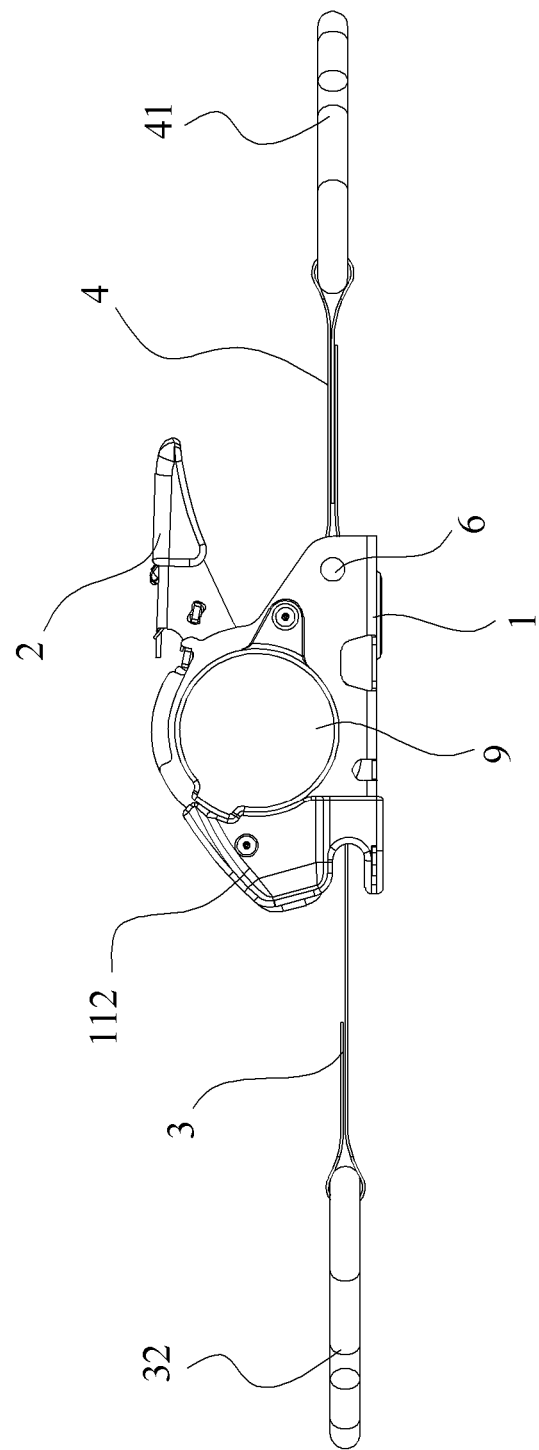
FIG. 13 is a front view of the safety tensioning device according to Embodiment 2 of the present invention.
Figure 14:
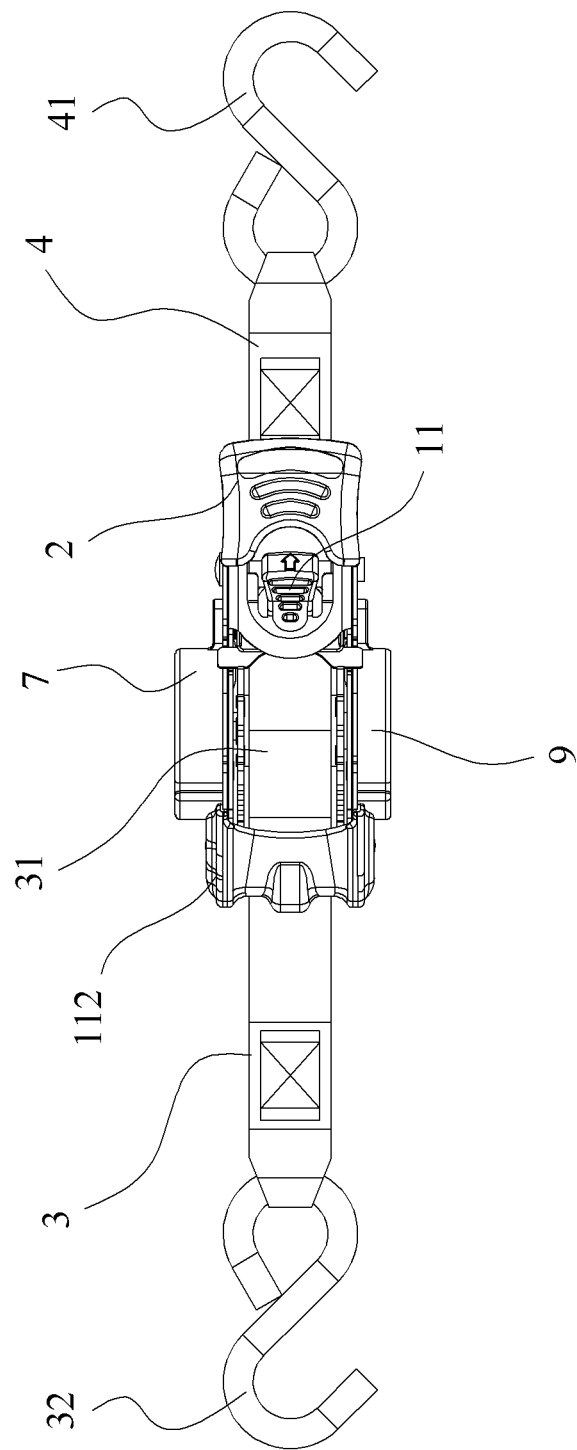
FIG. 14 is a top view of the safety tensioning device according to Embodiment 2 of the present invention.
Figure 15:
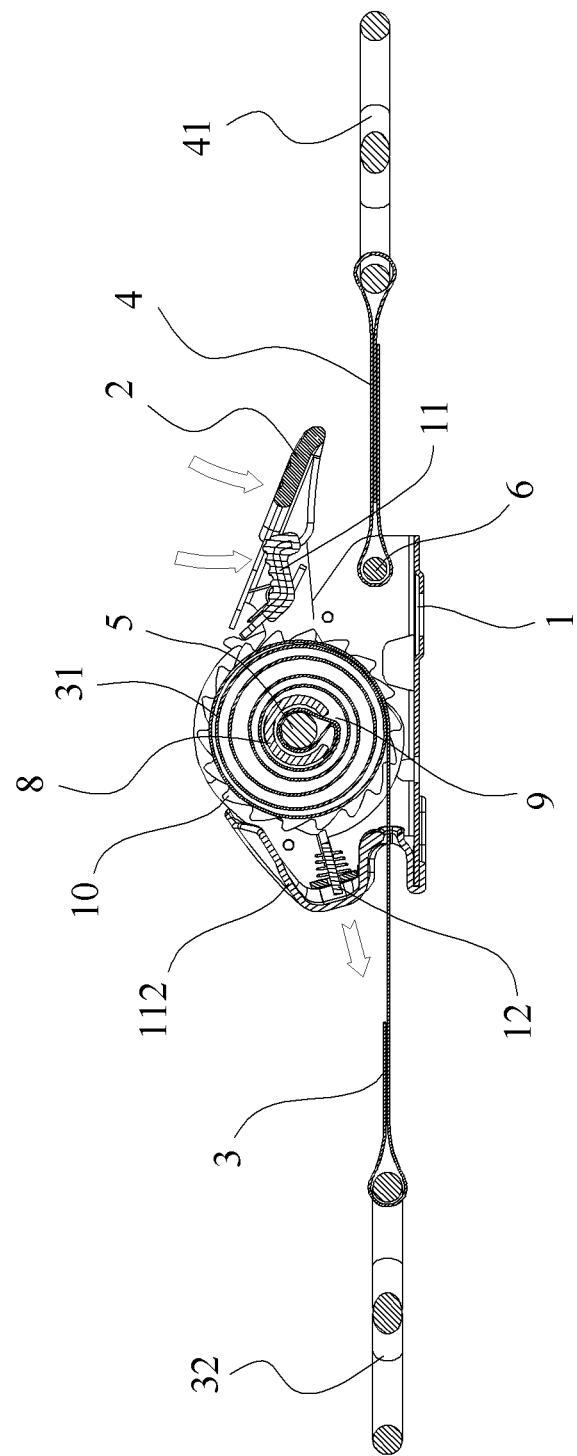
FIG. 15 is a sectional view of the safety tensioning device according to Embodiment 2 of the present invention.
Figure 16:
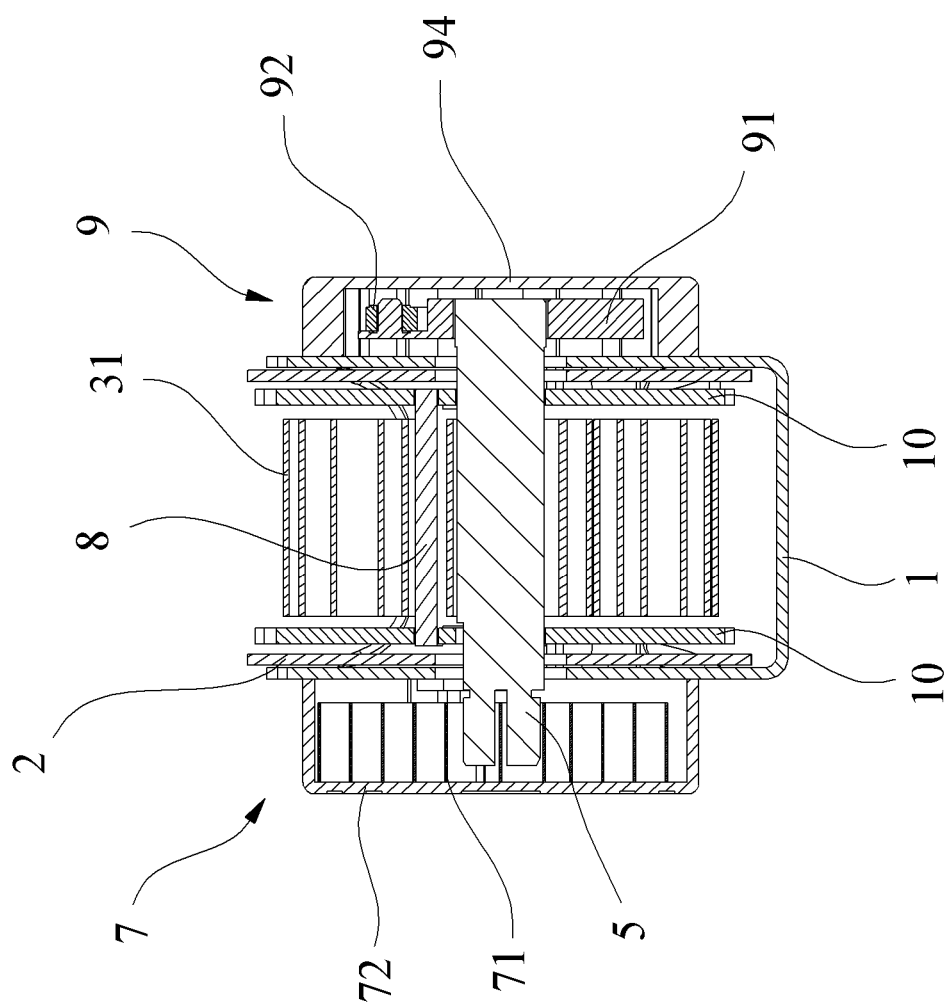
FIG. 16 is a sectional view of a winding portion according to Embodiment 2 of the present invention.
Figure 17:
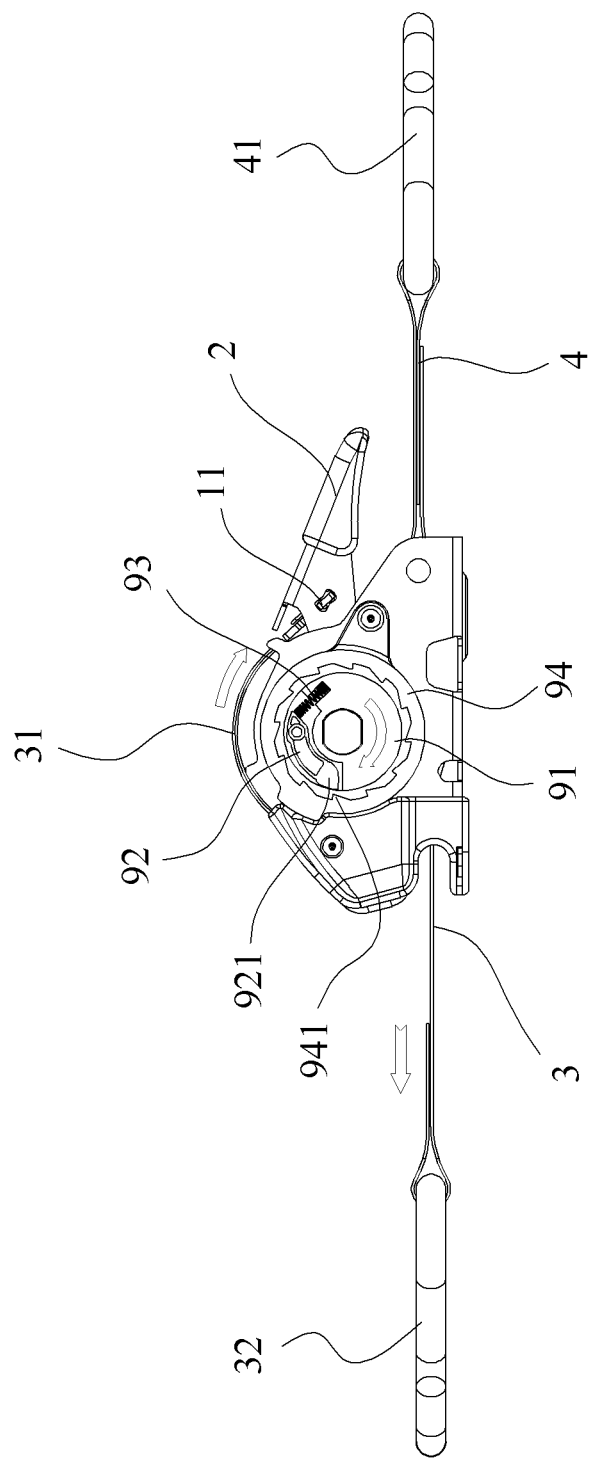
FIG. 17 is a diagrammatic view of a self-locking device when a long strap is pulled out according to Embodiment 2 of the present invention.
Figure 18:
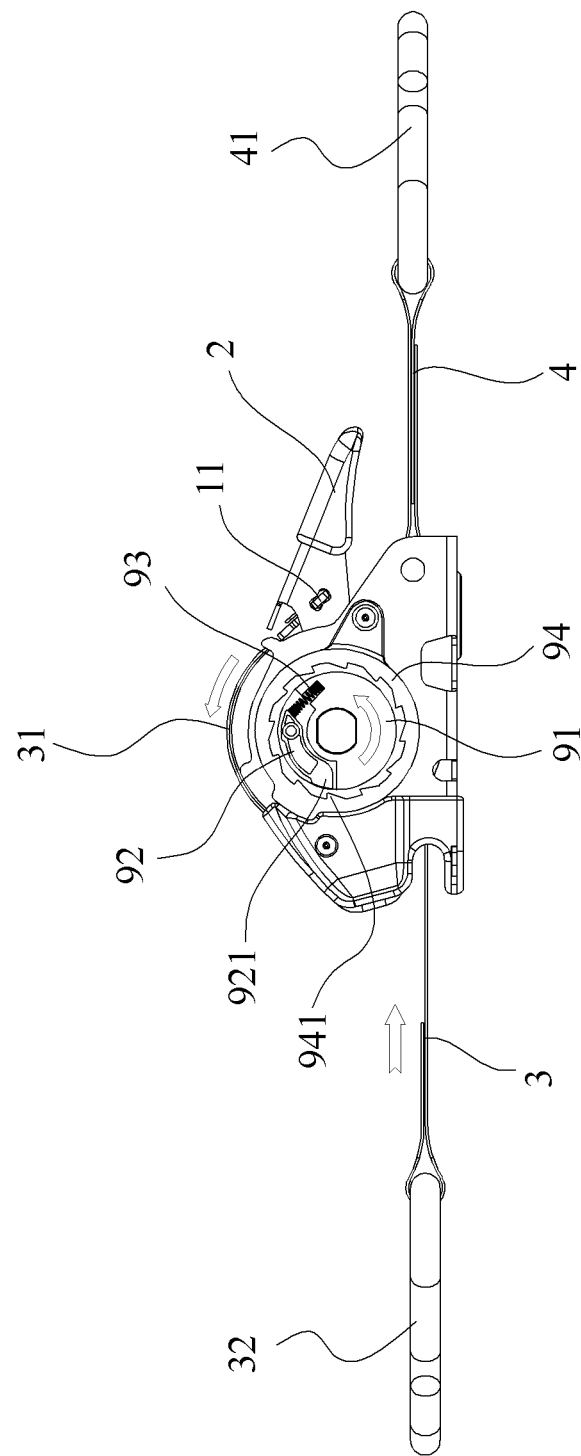
FIG. 18 is a diagrammatic view of the self-locking device when the long strap is retracted slowly according to Embodiment 2 of the present invention.
Figure 19:
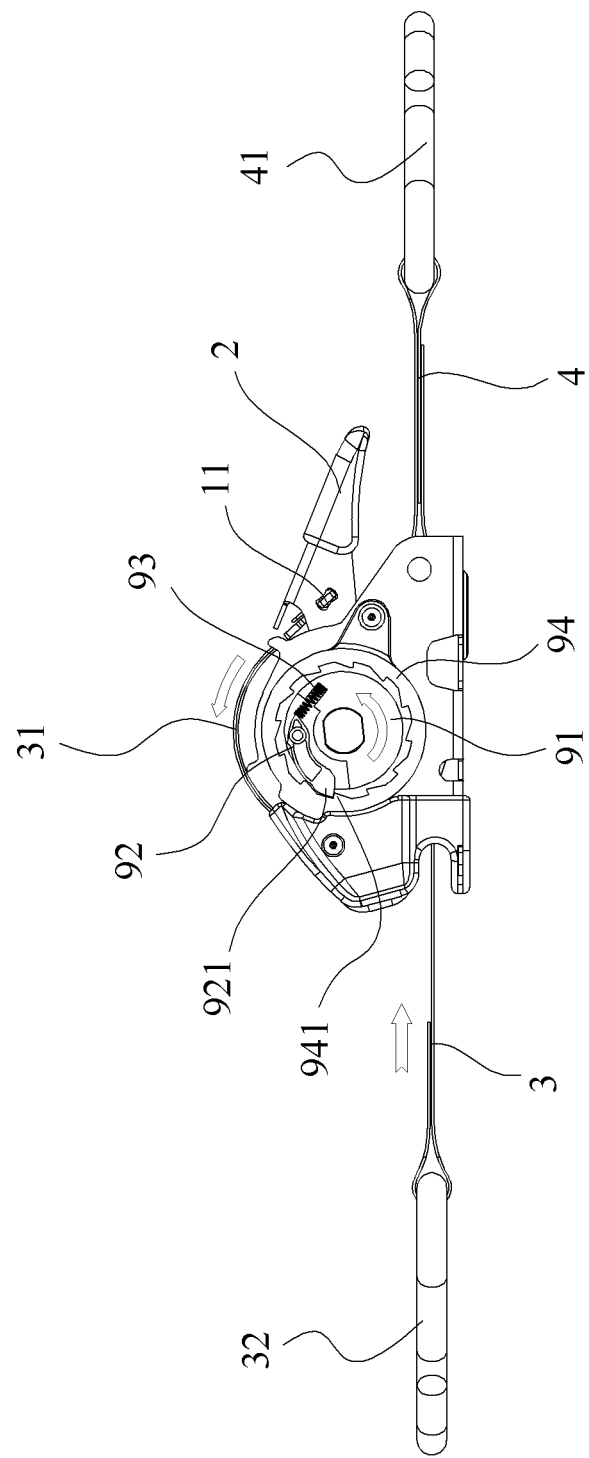
FIG. 19 is a diagrammatic view of the activation of self-locking when the long strap is retracted quickly according to Embodiment 2 of the present invention.

As shown in FIG. 11-FIG. 19, in the safety tensioning device for automobiles in this embodiment, a base housing 112 is disposed in the rear portion of the base 1. The main rotating shaft 5 and the winding shaft 8 are disposed coaxially. The main rotating shaft 5 axially passes through the winding shaft 8 and rotates with the winding shaft 8 synchronously. The main rotating shaft 5 and the winding shaft 8 are used for winding the strap and also bearing the tensile force of the device. As shown in FIG. 11, the ratchet wheels 10 are directly disposed on the winding shaft 8 to form a winding tray 14, and the handle 2 is disposed on the main rotating shaft 5. The coil spring box 72 of the coil spring component 7 and the self-locking ratchet wheel 94 of the centrifugal self-locking mechanism 9 are fixed on the base 1 by rivets 15.

When it is required to pull out or wind the strap, the driving pawl component 11 and the handle 2 need to be pressed down. The front cam of the handle 2 jacks up the locking pawl component 12, so that the driving pawl component 11 and the locking pawl component 12 are separated from the ratchet wheels 10 and not meshed with the ratchet wheels 10. In this way, the winding tray 14 can rotate with the main rotating shaft 5.

The operating principle of the centrifugal self-locking mechanism 9 in this embodiment is the same as that in Embodiment 1 and will not be repeated here.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A safety tensioning device for automobiles, the safety tensioning device comprising a base, a handle, a winding mechanism and a first bundling strap having an inner end and a free end; wherein
   the handle and the winding mechanism are disposed on the base;
   a main rotating shaft driven by the handle is rotatably disposed on the base;
   the first bundling strap is disposed on the main rotating shaft and the winding mechanism;
   the winding mechanism comprises a box for winded bundling strap, a coil spring component and a winding shaft with two ends;
   the winding shaft passes through the box, and the two ends of the winding shaft are exposed out of the box, the inner end of the first bundling strap is attached to the winding shaft; and
   one end of the winding shaft is attached to the coil spring component, a centrifugal self-locking mechanism is attached to another end of the winding shaft, to stop the winding shaft winding when a rotation speed of the winding shaft is in an overspeed state.

2. The safety tensioning device of claim 1, wherein the centrifugal self-locking mechanism comprises a rotary tray, a centrifugal pawl having a tooth portion, an elastic element and a self-locking ratchet wheel having a plurality of teeth;
   the rotary tray is attached to the winding shaft and is synchronously co-rotatable with the winding shaft, the centrifugal pawl is rotatably connected to the rotary tray, the elastic element is disposed between the rotary tray and the centrifugal pawl and keeps the tooth portion of the centrifugal pawl in a trend of doing a centripetal motion without being meshed with the teeth of the self-locking ratchet wheel.

3. The safety tensioning device of claim 2, wherein the elastic element is a spring; a pivot shaft protrudes from an upper portion of an outer side surface of the rotary tray; the centrifugal pawl is pivotally connected onto the pivot shaft; one end of the centrifugal pawl forms the tooth portion and the other end thereof forms a spring resisting portion; a boss is further disposed on the outer side surface of the rotary tray; and an upper end of the spring abuts against the spring resisting portion, while a lower end thereof abuts against the boss.

4. The safety tensioning device of claim 3, wherein the rotary tray, the centrifugal pawl and the spring are all disposed inside the self-locking ratchet wheel, and the teeth are disposed on an inner peripheral wall of the self-locking ratchet wheel.

5. The safety tensioning device of claim 2, wherein the rotary tray and the winding shaft are configured as separated components or integrated as one piece, and the box and the base are configured as separated components or integrated as one piece.

6. The safety tensioning device of claim 1, wherein a fixation shaft is disposed on the base, and a second bundling strap is attached to the fixation shaft.

7. The safety tensioning device of claim 1, wherein the coil spring component comprises a coil spring and a coil spring box sleeved on the coil spring; an inner hook of the coil spring is connected to the winding shaft, and an outer hook of the coil spring is connected to the coil spring box.

8. The safety tensioning device of claim 1, further comprising a transmission mechanism driven by the handle; wherein the transmission mechanism comprises a main rotating shaft, a plurality of ratchet wheels, a driving pawl component and a locking pawl component; the ratchet wheels are disposed on the main rotating shaft; both the driving pawl component and the locking pawl component are coordinated with the ratchet wheels; the driving pawl component is disposed on the handle, and the locking pawl component is disposed on the base.

9. The safety tensioning device of claim 8, wherein the main rotating shaft comprises a first semicircular shaft and a second semicircular shaft; the main rotating shaft is disposed in a front portion of the base; the ratchet wheels are respectively disposed at two ends of the main rotating shaft; the winding shaft is disposed in parallel in a rear portion of the main rotating shaft; and a front portion of the handle is disposed on the main rotating shaft.

10. The safety tensioning device of claim 8, wherein the main rotating shaft and the winding shaft are disposed coaxially; the main rotating shaft axially passes through the winding shaft and is rotatable with the winding shaft synchronously; the ratchet wheels are disposed on the winding shaft; and the handle is disposed on the main rotating shaft.

\* \* \* \* \*